US011019170B2

(12) United States Patent
Arolovitch et al.

(10) Patent No.: US 11,019,170 B2
(45) Date of Patent: *May 25, 2021

(54) METHODS AND SYSTEMS FOR CACHING DATA COMMUNICATIONS OVER COMPUTER NETWORKS

(71) Applicant: Zephyrtel, Inc., Austin, TX (US)

(72) Inventors: Alan Arolovitch, Brookline, MA (US); Shmuel Bachar, Herzliyya (IL); Dror Moshe Gavish, Shoham (IL); Shahar Guy Grin, Ramat HaSharon (IL); Shay Shemer, Hod Hasharon (IL)

(73) Assignee: ZEPHYRTEL, INC., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/685,717

(22) Filed: Nov. 15, 2019

(65) Prior Publication Data

US 2020/0084289 A1 Mar. 12, 2020

Related U.S. Application Data

(63) Continuation of application No. 14/667,071, filed on Mar. 24, 2015, now Pat. No. 10,484,497, which is a
(Continued)

(51) Int. Cl.
*G06F 15/167* (2006.01)
*H04L 29/08* (2006.01)
*G06F 16/957* (2019.01)
*H04N 21/63* (2011.01)

(52) U.S. Cl.
CPC ...... *H04L 67/2842* (2013.01); *G06F 16/9574* (2019.01); *H04L 67/14* (2013.01);
(Continued)

(58) Field of Classification Search
CPC ..... H04L 67/2842; H04L 67/16; H04L 67/22; H04L 67/14; H04L 67/1061;
(Continued)

(56) References Cited

U.S. PATENT DOCUMENTS 8,185,612 B1 * 5/2012 Arolovitch .......... G06F 16/9574
709/219
8,990,354 B2 * 3/2015 Arolovitch .............. H04L 67/22
709/219
(Continued)

OTHER PUBLICATIONS

Response to Amendment Under Rule 312 dated Oct. 16, 2019, filed in U.S. Appl. No. 14/667,071, pp. 1-2.
(Continued)

*Primary Examiner* — John B Walsh

(57) ABSTRACT

A computer-implemented method of caching multi-session data communications in a computer network, includes the steps of: (a) receiving, intercepting, or monitoring one or more data sessions between a client executing a multi-session application for retrieving a desired content object and one or more metadata services, said client communicating with the one or more metadata services to discover metadata for the content object; (b) analyzing queries and responses exchanged between the client and the one or more metadata services to discover metadata for the content object; (c) receiving or intercepting subsequent data sessions between the client and content sources; (d) identifying a data protocol used by the client and identifying data queries within the data sessions; (e) identifying the content object or portions thereof requested by the client in the data queries; and (f) determining if the content object or portions thereof are stored in cache and, if so, sending the content object or portions thereof stored in cache to the client, and, if not, sending the data queries to the content sources, storing data responses from the content sources, and sending the data responses to the client.

17 Claims, 2 Drawing Sheets

Related U.S. Application Data continuation of application No. 13/476,574, filed on May 21, 2012, now Pat. No. 8,990,354, which is a continuation of application No. 13/341,619, filed on Dec. 30, 2011, now Pat. No. 8,185,612.

(60) Provisional application No. 61/428,538, filed on Dec. 30, 2010.

(52) U.S. Cl.
CPC ............. *H04L 67/16* (2013.01); *H04L 67/22* (2013.01); *H04N 21/632* (2013.01); *H04L 67/108* (2013.01); *H04L 67/1061* (2013.01)

(58) Field of Classification Search
CPC ............. H04L 67/108; H04L 67/1078; H04L 67/2814; H04L 67/2823; G06F 16/9574; H04N 21/632
See application file for complete search history.

(56) References Cited

U.S. PATENT DOCUMENTS 10,484,497 B2 * 11/2019 Arolovitch ........... H04N 21/632
2008/0046596 A1 * 2/2008 Afergan ................ G06F 15/167 709/247

OTHER PUBLICATIONS

Amendment after NOA (Rule 312) dated Aug. 9, 2019, filed in U.S. Appl. No. 14/667,071, pp. 1-3.
Notice of Allowance dated Jul. 17, 2019, filed in U.S. Appl. No. 14/667,071, pp. 1-5.
Request for Continued Examination dated Jun. 3, 2019, filed in U.S. Appl. No. 14/667,071, pp. 1-3.
Notice of Allowance dated Mar. 1, 2019, filed in U.S. Appl. No. 14/667,071, pp. 1-9.
Petition Decision Routed to the Technology Center to Act on the Decision or Continue Prosecution, dated Feb. 7, 2019, filed in U.S. Appl. No. 14/667,071, pp. 1-3.
Petition for Review by the Office of Petitions dated Aug. 31, 2018, filed in U.S. Appl. No. 14/667,071, pp. 1-2.
Terminal Disclaimer dated Aug. 31, 2018, filed in U.S. Appl. No. 14/667,071, pp. 1-3.
Request for Continued Examination dated Aug. 31, 2018, filed in U.S. Appl. No. 14/667,071, pp. 1-6.
Non-Final Rejection dated Mar. 3, 2017, filed in U.S. Appl. No. 14/667,071, pp. 1-4.

* cited by examiner

METHODS AND SYSTEMS FOR CACHING DATA COMMUNICATIONS OVER COMPUTER NETWORKS

CROSS REFERENCE TO RELATED APPLICATION

This application claims priority from U.S. Provisional Patent Application No. 61/428,538, filed on Dec. 30, 2010, entitled METHODS AND SYSTEMS FOR CACHING DATA COMMUNICATIONS OVER COMPUTER NETWORKS, which is hereby incorporated by reference.

BACKGROUND

The present application relates generally to the caching of data communications over computer networks such as, e.g., the Internet, a local area network, a wide area network, a wireless network, and others.

Caching of data communications over computer networks is a well-known network optimization technique, affording improvement of application performance and optimal utilization of network resources through storing and delivering popular content close to end users.

Content caching solutions have traditionally focused on caching of client-server communications, e.g., Web browsing or streaming sessions, where the cache intermediates delivery of content objects (e.g., text files and images in case of Web browsing) from server to client.

The content applications supported by the caching solutions are designed to support caching; they do not utilize end-to-end encryption of the data session, and they have optional client-side explicit support for caching and utilize well-known data ports (tcp/80 for HTTP, tcp/1935 for RTMP, etc.).

The data sessions established by Web browsing and streaming applications are atomic. Each such session incorporates all information needed for the cache to identify a content query, content object (or portion of it) requested, and address of the content source where the object may be maintained.

The traditional caching solutions accordingly implement the following caching methodology:
- (a1) receiving the data session from the client or (a2) identifying and intercepting the data session between the client and content source, using well-known TCP or UDP port or ports or through Layer7 analysis of the data protocol, using a redirecting network element or otherwise;
- (b) parsing the data protocol used by the client to identify a data query within the session;
- (c) identifying a unique data object (or portion of it) requested by the client; and
- (d1) matching the data query with a data response stored in cache and sending the response to the client or (d2) propagating the data query to the server (content source), receiving the response from the server, optionally storing the response in the cache, and sending the response to the requesting client.

In recent years, Internet applications have evolved in functionality and complexity, using dynamic content object identifiers (e.g., HTTP URLs) that survive in the scope of one download session only, supporting transfer of the same content object over several concurrent sessions, from multiple content sources, involving multiple dynamic ports, involving end-to-end encryption of the data sessions. These new applications include multiple types of peer-to-peer (P2P) applications for file sharing and streaming, adaptive bitrate protocols for delivery of video over HTTP, HTTP download accelerators, and software update services such as Microsoft Windows Update.

The peer-to-peer applications typically implement a mechanism of "peer discovery" where the client application accesses the P2P network, queries the network to discover content sources that may offer the content object, and subsequently establishes data sessions with these content sources, with some of these sessions using end-to-end encryption.

It is a common practice for content sources in P2P networks to use dynamic rather than static "well-known" ports.

P2P applications can employ encryption of the session in such a way as to avoid detection by network elements, using Layer7 criteria for session identification.

As a result, traditional caching solutions cannot identify and intercept these data sessions, nor are they able to parse the data protocol to identify the data query, due to the encryption.

Non-P2P applications (e.g., download accelerators, adaptive bitrate video clients, software update services, and others) commonly establish multiple sessions to arrange retrieval of the same content object, where each separate session does not offer all the information needed for the cache to identify the requested data object and/or match a data request with a data response.

The features exhibited by these new applications obviate traditional caching methodology. It would be desirable to provide alternative approaches to content caching to support such new applications.

BRIEF SUMMARY OF THE DISCLOSURE

In accordance with one or more embodiments, a computer-implemented method of caching multi-session data communications in a computer network is provided, including the steps of: (a) receiving, intercepting, or monitoring one or more data sessions between a client executing a multi-session application for retrieving a desired content object and one or more metadata services, said client communicating with the one or more metadata services to discover metadata for the content object; (b) analyzing queries and responses exchanged between the client and the one of more metadata services to discover metadata for the content object; (c) receiving or intercepting subsequent data sessions between the client and content sources; (d) identifying a data protocol used by the client and identifying data queries within the data sessions; (e) identifying the content object or portions thereof requested by the client in the data queries; and (f) determining if the content object or portions thereof are stored in cache and, if so, sending the content object or portions thereof stored in cache to the client, and, if not, sending the data queries to the content sources, storing data responses from the content sources, and sending the data responses to the client.

In accordance with one or more embodiments, a computer-implemented caching service is provided for caching multi-session data communications in a computer network. The caching service is configured to: (a) receive, intercept, or monitor one or more data sessions between a client executing a multi-session application for retrieving a desired content object and one or more metadata services, said client communicating with the one or more metadata services to discover metadata for the content object; (b) analyze queries and responses exchanged between the client and the one of more metadata services to discover metadata for the content object; (c) receive or intercept subsequent data sessions between the client and content sources; (d) identify a data protocol used by the client and identify data queries within the data sessions; (e) identify the content object or portions thereof requested by the client in the data queries; and (f) determine if the content object or portions thereof are stored in cache and, if so, send the content object or portions thereof stored in cache to the client, and, if not, send the data queries to the content sources, store data responses from the content sources, and send the data responses to the client.

DETAILED DESCRIPTION

In accordance with various embodiments, a service is provided for caching of applications that utilize multiple sessions for retrieval of same content object (e.g., file or stream).

The multi-session applications supported by the caching service can include:
 (a) applications that utilize one or more sessions to discover information about a content object (hereinafter "content object meta-data"), that identifies the content sources that the application contacts to retrieve the content object, data protocols used to do so, and data queries used to retrieve the object.
 (b) applications that utilize multiple sessions to retrieve the content object, passing information necessary for object identification only in some of the sessions.

Figure 1:
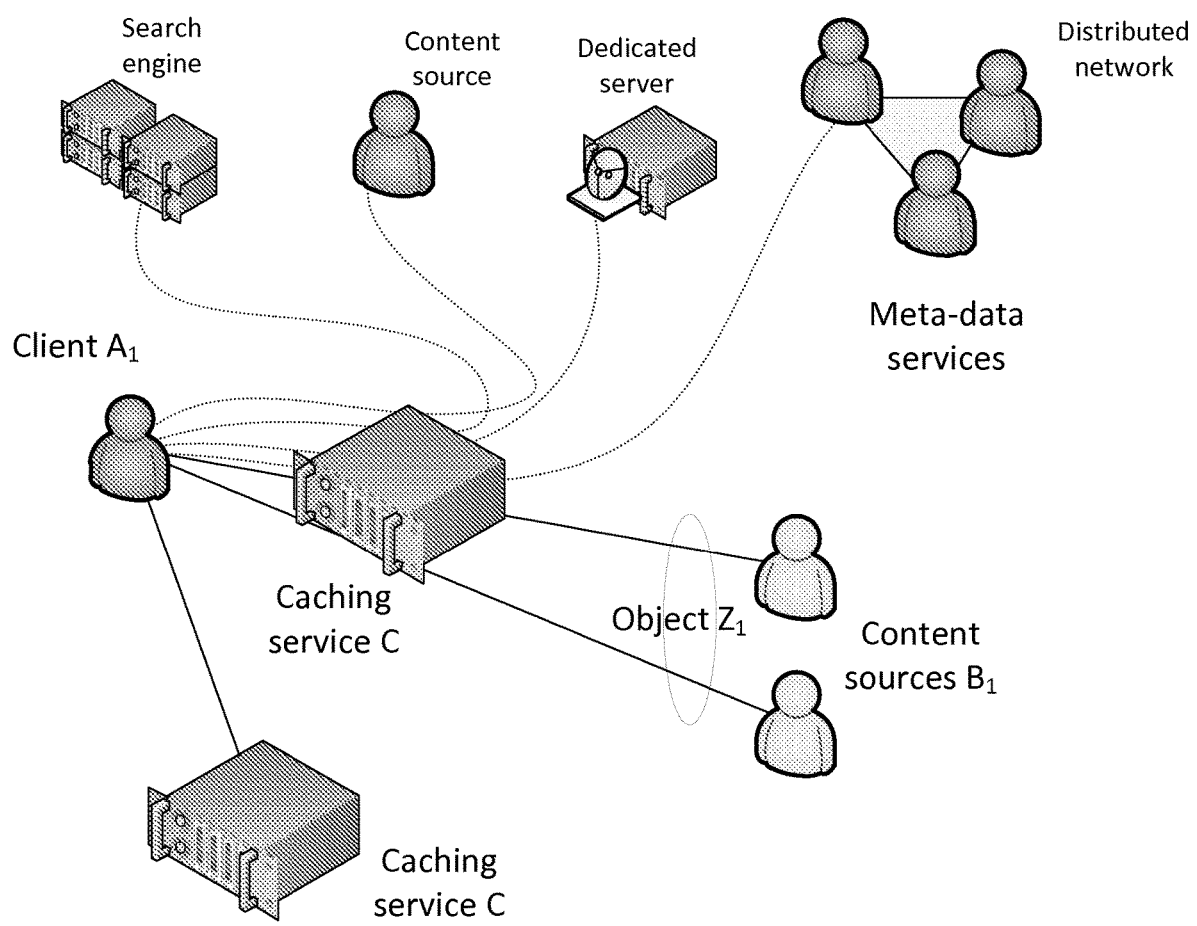
FIG. 1 is simplified diagram illustrating deployment of a caching service in accordance with one or more embodiments.
Figure 2:
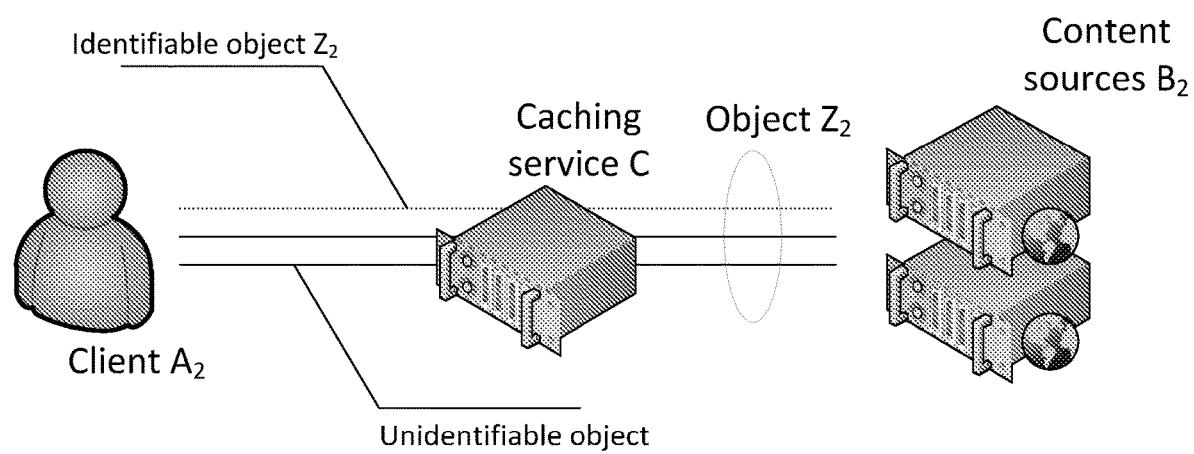
FIG. 2 is a simplified diagram illustrating deployment of a caching service in accordance with one or more alternate embodiments.

(a) Multi-Session Applications Utilizing Content Object Meta-Data for Content Object Retrieval FIG. 1 illustrates an exemplary network architecture illustrating use of a caching service In accordance with one or more embodiments. Client $A_1$ establishes multiple sessions to one or more meta-data services M on a network, sends data queries to retrieve content object meta-data for content object $Z_1$, and receives one or more responses from the meta-data services M.

The content object meta-data includes at least one variable, selected from the following:
 (i) addresses of content source(s);
 (ii) protocols supported by an individual content source;
 (iii) encryption keys, per object or per individual content source; and
 (iv) content object structure.

The content source address can be identified through an IP address, e.g., using IPv4 IP address 1.1.1.1 or IPv6 address fe80::200:f8ff:fe21:67cf, or using a domain name, e.g., cache12.bos.us.cdn.net, that can be resolved to IP address using Domain Name System (DNS).

The content source address can use either implicitly named port number for applications using well-known protocol ports (e.g., port tcp/80 used by HTTP protocol) or name ports explicitly.

The content source address can be identified in conjunction with protocols supported by it, including, but not limited to, using universal resource locators (URL), as defined in RFC1738, that specifies protocol, content source address, port and remote path to the object.

The content object structure information includes information allowing client $A_1$ to form data queries for parts of the object and to verify correctness of data responses received in response to such queries.

The content object structure information includes information pertaining to parts comprising the objects, e.g., "pieces" used by Bittorrent protocol, "parts" used by eDonkey P2P protocol or "playback levels" used in adaptive bitrate streaming protocols, such as Microsoft Silverlight Smooth Streaming, Adobe HTTP Dynamic Streaming, Apple HTTP Live Streaming, among others.

The information about content objects parts includes at least one of the following: enumeration of parts of the content object, length of each part, data checksum of each part, availability of parts at a specific content source, where the content source is identified using content source addresses as defined in [0023-0025] above.

The meta-data including all or some of the above information can be stored in a separate file with a pre-defined structure, e.g. a torrent file for Bittorrent or a manifest file used by Microsoft Silverlight smooth streaming.

The meta-data services M offering content object meta-data may include dedicated network servers designed to support delivery of a specific application or one or more content objects (e.g., Bittorrent trackers, ED2K servers, etc.), generic search engines (Google, Microsoft Bing, or others), a network of computer nodes that collectively stores the meta-data (e.g. distributed hash table networks used by P2P applications), or other clients that participate in distributed content source discovery networks (e.g., distributed hash table networks), or other clients that are downloading and/or serving the content object $Z_1$ and maintain meta-data related to it.

Client $A_1$ may use multiple meta-data services M to discover content object meta-data, where one service $M_1$ can provide part of the content object meta-data and optionally point to another service $M_2$ to provide another part.

Thus, for example, client $A_1$ may retrieve a torrent file from a Bittorrent search engine that includes the content object data structure information as well as URL of a Bittorrent tracker that provides the information of currently active content source addresses.

Client $A_1$ may continue to send data queries to meta-data services M during download of content object $Z_1$ or portions of it, for purposes of identification of new content sources and/or content object structure information (for example, in case of object $Z_1$ being a live stream, of which new parts become continuously available).

In accordance with one or more embodiments, the caching service C receives and stores data queries and/or responses exchanged between client $A_1$ and one or more meta-data services M.

In accordance with one or more embodiments, the caching service C intercepts the sessions between $A_1$ and M, either by being in data path between $A_1$ and B, or through use of one or more dedicated redirection devices (e.g., a load balancer, a router, a DPI device, etc.) that sit in data path and redirect specific data sessions to the caching service C, and relays the data queries and responses between $A_1$ and M.

In accordance with one or more embodiments, the caching service C modifies at least one of the meta-data responses provided by the meta-data service M, e.g., to indicate the caching service C as a content source or as a meta-data service for the content object $Z_1$.

In accordance with one or more embodiments, the caching service C receives a copy of communications between the client $A_1$ and the meta-data services M, using an optical tap, mirror port or other device replicating network traffic.

In accordance with one or more embodiments, the caching service C receives the data queries related to content object $Z_1$ from client $A_1$ by virtue of offering at least one of the meta-data services M.

In accordance with one or more embodiments, the caching service C subsequently queries the meta-data services M itself for meta-data related to content object $Z_1$, and receives and stores the responses.

In accordance with one or more embodiments, the caching service C continuously analyzes the queries and responses exchanged between at least one client $A_1$ and the meta-data services M, as well as the responses received by the caching service C directly from the meta-data services M, as described above.

As a result, the caching service C maintains content object meta-data $M_2$ for at least one content object $Z_1$ that client $A_1$ is retrieving.

In accordance with one or more embodiments, the caching service C stores meta-data responses as part of meta-data $M_z$ in conjunction with the most recent time the response was received by C.

The caching service C subsequently periodically discards any responses that were received more than some time ago based on time-out.

In accordance with one or more embodiments, the caching service monitors meta-data requests and responses and discards any stored responses that contradict meta-data responses received later.

Following retrieval of meta-data pertaining to the content object $Z_1$, the client $A_1$ and at least one of content sources $B_1$ discovered by the client $A_1$ using the meta-data services M, start establishing data sessions with each other, for purpose of retrieving content object $Z_1$ or part of it by $A_1$.

In accordance with one or more embodiments, the caching service C intercepts the data sessions $S_1$ established between the client $A_1$ and the content sources $B_1$.

In accordance with one or more embodiments, the caching service C intercepts the data sessions either by being in a data path between $A_1$ and $B_1$, or through use of one or more dedicated redirection devices (e.g., load balancer, router, DPI device, etc.) that sit in data path and redirect specific data sessions to the caching service C.

In accordance with one or more embodiments, the caching service C intercepts only such sessions that have been established between $A_1$ and such content sources $B_1$', that match the meta-data Mz stored for the object $Z_1$ by the caching service C.

In accordance with one or more embodiments, the client $A_1$ establishes at least one session $S_2$ with the caching service C, which is identified by the client $A_1$ as one of the content sources for the content object $Z_1$.

In accordance with one or more embodiments, the caching service C utilizes at least one of the following protocols to interpret data queries and data responses in the session $S_1$ between the client $A_1$ and content source $S_1$:
  (i) data protocols associated with the client $A_1$, as part of meta-data $M_z$, as described above;
  (ii) data protocols associated with the session $S_1$, as part of meta-data $M_z$, as described above; and
  (iii) data protocols identified by the caching service C when analyzing the data queries and responses received in the session $S_1$, using signature-based or other generic protocol identification technique.

In accordance with one or more embodiments, the caching service C utilizes similar approach for session $S_2$.

In accordance with one or more embodiments, when failing to identify data protocol of session $S_1$ and $S_2$, using method described in [0048], the caching service C may apply at least one of encryption keys K, stored by C as part of the meta-data Mz, to establish an encrypted session with either client $A_1$, or content source $B_1$, or both.

The encryption keys K may be associated with the content object Z (e.g., in Bittorrent the hash identifier of object Z is used for encryption of sessions between Bittorrent peers), or specific content sources.

In accordance with one or more embodiments, following establishment of data session with client $A_1$ and identification of the protocol used in this session, the caching service C receives data query $Q_1$ for object $Z_1$ or portion of it from the client $A_1$.

In accordance with one or more embodiments, the caching service C identifies a response matching the query, using the meta-data Mz associated with the content object $Z_1$ as described above.

For example, if the client $A_1$ requests a chunk of 500 Kbps playback level of content object $Z_1$, available over Microsoft Silverlight smooth streaming protocol, that starts at offset 0, without identification of the end offset, the caching service C may use the meta-data Mz describing the object $Z_1$, to identify the end offset.

In accordance with one or more embodiments, if the matching response $R_1$ to the query $Q_1$ is stored by the caching service C, C delivers the response to the end client $A_1$.

In accordance with one or more embodiments, the caching service C may use the stored meta-data Mz associated with the content object Z to verify the validity of the data response $R_1$, before sending it to the client $A_1$.

In accordance with one or more embodiments, when a matching response to the query $Q_1$ is not available at the caching service C and the query $Q_1$ has been sent as part of session $S_1$ between the client A1 and the content source $B_1$, the caching service C forwards the query to retrieve such response from the content source $B_1$, receives and optionally stores the response and relays the response to the client $A_1$.

In accordance with one or more embodiments, when a matching response to the query $Q_1$ is not found at the caching service C, the caching service C sends data query $Q_1$' allowing it to respond to the data query $Q_1$ to at least one of content sources B, identified by C as carrying the content object Z, based on the meta-data Mz stored by C.

Subsequently, the caching service C receives the responses $R_1$' for these queries, stores them and optionally verifies their validity against the meta-data Mz, and delivers response to the query $Q_1$ to the client $A_1$.

In accordance with one or more embodiments, when a matching response to the query $Q_1$ is not found at the caching service C, C may redirect the client $A_1$ to one of content sources B for the content object Z, as stored by the caching service in the meta-data Mz.

(b) Multi-Session Applications Allowing Identification of Content Object Only in Some Sessions Client $A_2$ establishes multiple sessions $S_2$ to one or more destinations $B_2$ to retrieve content object $Z_2$, in parallel or in series. The client $A_2$ sends data queries for portions of the content object $Z_2$ in each such session.

Depending on the naming convention for the content object Z and/or its parts, used by client $A_2$ and destination(s) $B_2$, the caching service C, intercepting or receiving sessions $S_2$, may not be able to identify the content object and/or portions of it requested by client $A_2$ in each session, or identify data responses matching those queries.

The client $A_2$ and content source(s) $B_2$ may use dynamic URL (so-called "hashed URLs") to identify object $Z_2$ that is assigned uniquely for each download of the content object $Z_2$. In this case caching service C cannot rely on the data in the data query alone to identify a matching response, but rather analyzes data responses to identify the requested object and match it to the previously stored data responses.

According to one or more embodiments, when receiving such data queries and/or responses in one or more sessions $S_2$ that allow identification of the content object Z, C stores the content object $Z_2$ identification together with the IP address of client $A_2$, the IP address of content source $B_2$, and the dynamic content identification (e.g. URL) used by client $A_2$, in a list $L_2$.

According to one or more embodiments, when caching service C receives a data query and/or data response that does not allow it to identify the content object Z referenced in the query and/or response, caching service C establishes whether the IP address of client $A_2$, dynamic content identification URL, and IP address of content source $B_2$ are stored in list $L_2$.

According to one or more embodiments, in case of applications that utilize multiple content sources, the caching service C may disregard the IP address of content source $B_2$.

According to one or more embodiments, caching service C removes entries from list $L_4$ based on the timeout since last activity seen by client $A_2$, related to content object $Z_2$.

The processes of the caching service described above may be implemented in software, hardware, firmware, or any combination thereof. The processes are preferably implemented in one or more computer programs executing on a programmable device including a processor, a storage medium readable by the processor (including, e.g., volatile and non-volatile memory and/or storage elements), and input and output devices. Each computer program can be a set of instructions (program code) in a code module resident in the random access memory of the device. Until required by the device, the set of instructions may be stored in another computer memory (e.g., in a hard disk drive, or in a removable memory such as an optical disk, external hard drive, memory card, or flash drive) or stored on another computer system and downloaded via the Internet or other network.

Having thus described several illustrative embodiments, it is to be appreciated that various alterations, modifications, and improvements will readily occur to those skilled in the art. Such alterations, modifications, and improvements are intended to form a part of this disclosure, and are intended to be within the spirit and scope of this disclosure. While some examples presented herein involve specific combinations of functions or structural elements, it should be understood that those functions and elements may be combined in other ways according to the present disclosure to accomplish the same or different objectives. In particular, acts, elements, and features discussed in connection with one embodiment are not intended to be excluded from similar or other roles in other embodiments.

Additionally, elements and components described herein may be further divided into additional components or joined together to form fewer components for performing the same functions. For example, the caching service may comprise one or more physical machines, or virtual machines running on one or more physical machines. In addition, the caching service may comprise a cluster of computers or numerous distributed computers that are connected by the Internet or another network.

Accordingly, the foregoing description and attached drawings are by way of example only, and are not intended to be limiting.

What is claimed is:

1. An apparatus comprising:
   a processor; and
   a memory, coupled to the processor, that stores code for caching multi-session data communications in a computer network, wherein when the code is executed by the processor, the apparatus is configured to perform:
   (a) receiving, intercepting, or monitoring one or more data sessions between a client executing a multi-session application for retrieving a desired content object and one or more metadata services, said client communicating with the one or more metadata services to discover metadata for the content object;
   (b) analyzing queries and responses exchanged between the client and the one of more metadata services to discover metadata for the content object;
   (c) receiving or intercepting subsequent data sessions between the client and content sources;
   (d) identifying a data protocol used by the client and identifying data queries within the data sessions;
   (e) identifying the content object or portions thereof requested by the client in the data queries; and
   (f) determining if the content object or portions thereof are stored in cache and, if so, sending the content object or portions thereof stored in cache to the client, and, if not, sending the data queries to the content sources, storing data responses from the content sources, and sending the data responses to the client.

2. The apparatus of claim 1, wherein step (b) comprises analyzing queries and responses exchanged between the client computer system and the one or more metadata services on an ongoing basis to discover metadata for the content object.

3. The apparatus of claim 1, wherein step (c) comprises intercepting only subsequent data sessions having content sources that are known from the metadata.

4. The apparatus of claim 1, wherein step (d) comprises using the metadata to identify the data protocol used by the client computer system and to identify data queries within the subsequent data sessions.

5. The apparatus of claim 1, wherein step (d) comprises using the metadata to detect and decrypt an encrypted protocol used in data sessions.

6. The apparatus of claim 1, wherein step (e) comprises identifying incomplete data in the queries or responses to queries, and obtaining further information from the metadata to complete the incomplete data.

7. The apparatus of claim 1, wherein step (f) comprises using the metadata to determine if the content object or portions thereof are stored in cache.

8. The apparatus of claim 1, wherein further comprising a caching service, and wherein step (f) comprises establishing at least one session with the client, said caching service comprises at least one of the content sources for the content object.

9. The apparatus of claim 1, wherein step (f) comprises using the metadata to verify the validity of the content object stored in cache prior to storing the data responses, and optionally discarding the data responses that do not match the metadata.

10. The apparatus of claim 1, wherein step (f) comprises using the metadata to verify the validity of data responses stored in cache to determine whether a matching data response or portions thereof are stored in cache, and discarding the data responses that do not match the metadata.

11. The apparatus of claim 1, wherein the metadata identifies addresses of content sources storing the content object or portions thereof, data protocols supported by the content sources, encryption keys for the content object or content sources, or content object structure.

12. The apparatus of claim 1, wherein when the code is executed by the processor, the apparatus is configured to further perform modifying metadata sent by the one or more metadata services to the client to indicate a caching service as a content source or as a meta data service for the content object.

13. The apparatus of claim 1, wherein when the code is executed by the processor, the apparatus is configured to further perform sending queries to the one or more metadata services for metadata related to the content object, and receiving and storing responses to the queries.

14. The apparatus of claim 1, wherein when the code is executed by the processor, the apparatus is configured to further perform storing metadata received or intercepted from or through monitoring of data from the one of more metadata services, and discarding stored metadata received more than a given period of time ago.

15. The apparatus of claim 1, wherein when the code is executed by the processor, the apparatus is configured to further perform storing metadata received from the one of more metadata services, and discarding stored metadata contradicting more recently received metadata.

16. The apparatus of claim 1, wherein the data protocol is associated with the client computer system or with the session.

17. The apparatus of claim 1, wherein the data protocol is identified using a signature-based protocol identification technique.

\* \* \* \* \*